Oct. 21, 1969    R. S. ELLIOTT ET AL    3,473,826
DRAWBAR AND BALL ASSEMBLY
Filed Nov. 7, 1967
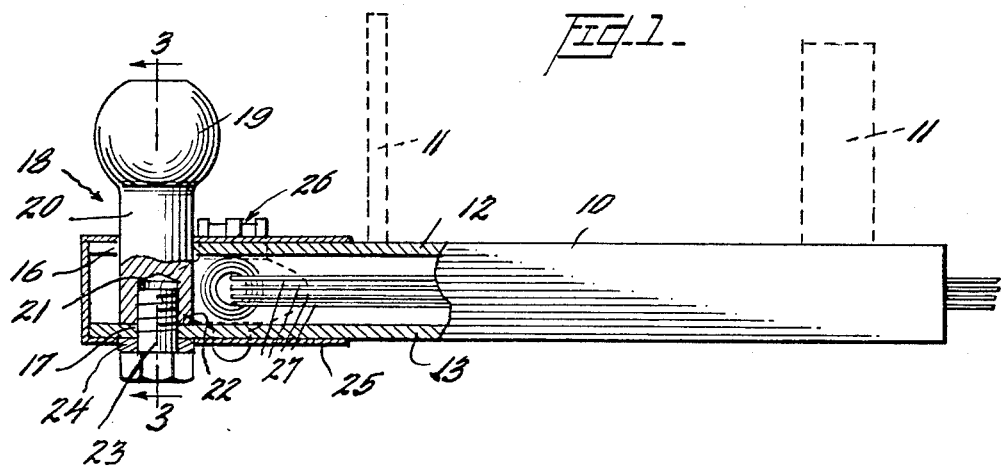
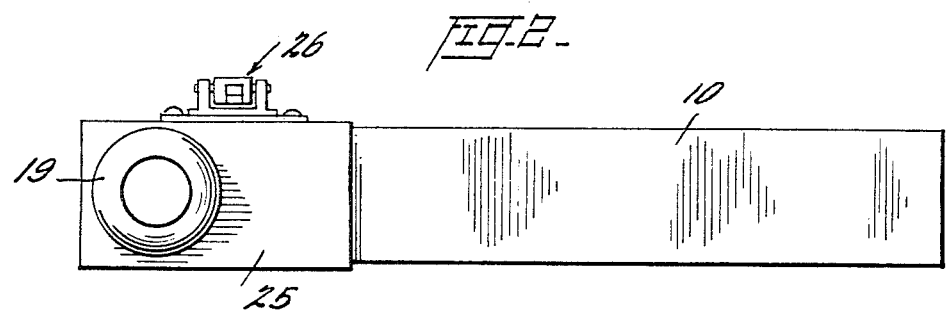
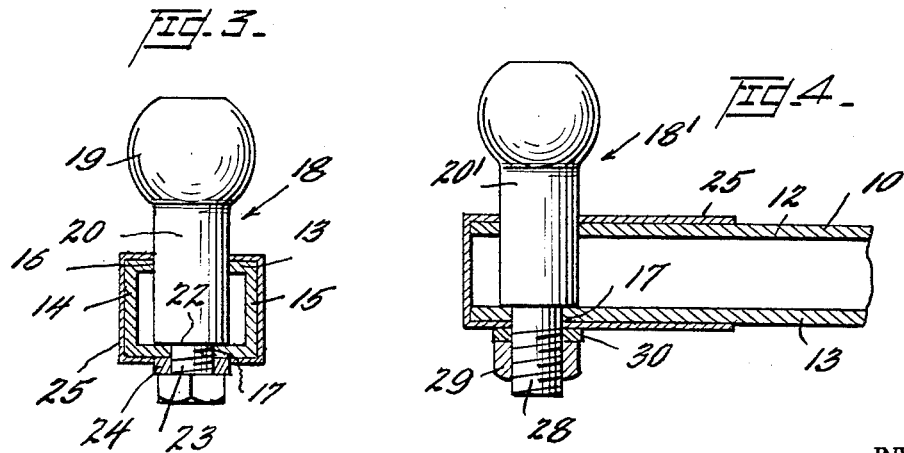
INVENTORS
Reginald S. Elliott
John Broocks Dalton
BY
Watson, Cole, Grindle & Watson
ATTORNEYS

United States Patent Office 3,473,826
Patented Oct. 21, 1969

3,473,826
DRAWBAR AND BALL ASSEMBLY
Reginald S. Elliott and John Broocks, Dalton, Warsaw, Ind., assignors to Big Boy Products, Inc., Warsaw, Ind., a corporation of Indiana
Filed Nov. 7, 1967, Ser. No. 681,167
Int. Cl. B60d 1/06, 1/14
U.S. Cl. 280—422                                    5 Claims

ABSTRACT OF THE DISCLOSURE

A drawbar and ball assembly for a trailer hitch, in which the drawbar is a tube of substantially rectangular transverse section and the ball member has an elongated shank extending through the upper wall of the tubular drawbar and seated upon the inner surface of the lower wall thereof, with means for securing the ball member in this position. Electrical conductors may be housed within the drawbar, the exposed end of which is closed by a protective sleeve, the conductors terminating at an outlet fixture mounted exteriorly of the drawbar adjacent the ball member.

BACKGROUND OF THE INVENTION

The present invention relates to trailer hitches, and more particularly to an improved drawbar and ball assembly for attachment to a towing vehicle.

The conventional drawbar and ball assembly, now almost universally employed, consists in a solid or channel section steel drawbar, attached to the towing vehicle and carrying at its outer or rearward end a ball-shaped fixture having a short neck and a flange at the bottom which seats on top of the drawbar. The ball is affixed to the drawbar by means of a bolt and nut, the bolt being usually machined as an integral part of the ball. One of the shortcomings of the conventional assembly of this type is that it occasionally fails under heavy load, the failure usually occurring through breakage of the bolt portion or the flange portion. A primary object of the present invention is to overcome this disadvantage of the conventional assembly.

SUMMARY OF THE INVENTION

More specifically, it is an object of the present invention to provide a drawbar and ball assembly comprising a metallic drawbar, preferably of steel, in the form of a hollow tube of substantially rectangular transverse section and having upper and lower walls, and a steel ball member having an elongated shank portion extending through the upper wall of the drawbar and seating upon the inner surface of the lower wall of the drawbar, with means for securing the ball member in that position. Preferably, a sleeve surrounds and encloses the exposed end of the drawbar to protect the assemblage against the entrance of dirt and moisture. If, as is usual, the trailer hitch includes electrical connections extending from the towing vehicle to the towed vehicle, the electrical conductors may be extended within the hollow drawbar and through a wall thereof to an outlet fixture attached exteriorly of said wall.

BRIEF DESCRIPTION OF THE DRAWING

Other and further objects, features and advantages will be apparent from the description which follows, read in connection with the accompanying drawings, in which:

FIGURE 1 is a side view, partly in elevation and partly in section, of a drawbar and ball assembly according to the present invention;

FIGURE 2 is a plan view of the device illustrated in FIGURE 1;

FIGURE 3 is a transverse section on line 3—3 of FIGURE 1; and

FIGURE 4 is a fragmentary sectional view corresponding to FIGURE 1 but illustrating a modified form of the invention.

DESCRIPTION OF THE PREFERRED EMBODIMENTS

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, the present invention comprises a drawbar 10 to which are secured brackets 11 of any suitable form for connecting the drawbar 10 securely to the towing vehicle. The brackets 11, which form no part of the present invention, are illustrated in broken lines. The drawbar 10 is preferably of rectangular or substantially rectangular transverse section, as best seen in FIGURE 3, comprising upper and lower walls 12 and 13 respectively and opposed side walls 14 and 15 respectively. The upper wall 12 is provided, near its free or outer end, shown at the left in FIGURE 1, with a preferably circular aperture 16, while the lower wall 13 is provided with a smaller, preferably circular, aperture 17 in axial alignment with the aperture 16.

A ball member 18 comprises a parti-spherical head 19, shaped to accommodate the usual socket fixture attached to the towed vehicle, and an elongated shank portion 20, preferably of circular section and of substantial diameter and corresponding strength. The diameter of the shank 20 is such as to engage relatively tightly within the aperture 16 of the upper wall 12 of the drawbar 10 and, in the embodiment of FIGURE 1, the shank 20 is provided at its lower end with a central, axially directed, internally threaded hole 21. The lower annular end surface or shoulder 22 of the shank 20 seats upon the inner surface of the lower wall 13 of the drawbar and is maintained in tight engagement therewith by means of a bolt 23 engaging the threaded bore 21, a lock washer 24 preferably being gripped between the head of the bolt 23 and the outer surface of the wall 13.

A sleeve 25 closed at one end and provided with upper and lower apertures corresponding to the apertures 16 and 17 of the drawbar 10 is preferably telescoped onto the drawbar 10 before the ball member 18 is installed therein.

A conventional electrical outlet fixture 26 is preferably affixed to a side wall of the drawbar 10, outside of the sleeve 25 if the latter is employed, the insulated conductors 27 extending from suitable switching means (not shown) on the towing vehicle through the hollow drawbar 10 and through suitable apertures in the wall thereof to the fixture 26.

As illustrated in FIGURE 4, the shank 20' of the ball member 18' may be provided with a threaded extension or bolt portion 28. In this form of the invention, the bolt portion 28 extends through the lower aperture 17 of the drawbar and through the corresponding aperture in the sleeve 25, and a nut 29 is secured on the extension 28, preferably with the interposition of a lock washer 30 between the nut 29 and the sleeve 25.

In either form of the invention, the drawbar and ball assembly possesses substantially greater strength than the conventional type of assembly now in use, not only because of the increased strength of the box section drawbar portion, but also because the shank portion of the ball member, which may be of very substantial diameter, divides the load, imposed on it by the towed vehicle, between the upper and lower walls 12 and 13 of the drawbar. In effect, the upper wall 12 is put in tension while the lower wall 13 is put in compression, when a rearwardly directed force is applied to the ball portion 19. Due to the increased area of contact between the ball member and the drawbar, and the increased strength of these respective parts, the likelihood of a damaging deformation or breakage is greatly reduced.

A further advantage of the present invention is that the ball member may be formed by a simple forging operation, after which the bore 21 or the extension 28, as the case may be, is threaded. On the contrary, the conventional ball member now in use is necessarily formed by a relatively expensive machining operation.

Having thus described the invention what is claimed as new and desired to be secured by Letters Patent is:

1. In a trailer hitch, a drawbar and ball assembly comprising a metallic drawbar in the form of a hollow tube of substantially rectangular transverse section and having upper, lower and opposite side walls, said upper and lower walls of said drawbar having aligned apertures therethrough near one end thereof, a metallic ball member having a parti-spherical head portion and an elongated shank portion, said shank portion extending tightly through the aperture in said upper wall and seating on the upper surface of said lower wall, and means extending through the aperture in said lower wall for tightening said shank portion against said lower wall.

2. The device defined in claim 1, including a sleeve surrounding and enclosing the said end of said drawbar, said sleeve having apertures to accommodate said shank portion and said tightening means respectively.

3. The device defined in claim 1, including an electrical outlet fixture mounted exteriorly on said drawbar adjacent said ball member, electrical conductors extending within said tubular drawbar and through a wall thereof to said fixture, and means insulating said conductors and fixture from said drawbar.

4. The device defined in claim 1, said tightening means comprising a threaded extension of said shank portion passing through the aperture in said lower wall, and a nut threaded on said extension exteriorly of said lower wall.

5. The device defined in claim 1, said tightening means comprising an internally threaded bore in the lower end of said shank portion and a bolt extending through the aperture in said lower wall and engaging said threaded bore.

References Cited

UNITED STATES PATENTS

| 2,261,220 | 11/1941 | Brown | 280—511 X |
|---|---|---|---|
| 2,360,823 | 10/1944 | Austin | 280—511 X |
| 2,416,502 | 2/1947 | Thompson | 280—511 X |
| 2,793,878 | 5/1957 | Toland | 280—406 |
| 2,856,036 | 10/1958 | Mullen | 280—511 X |
| 3,116,940 | 1/1964 | Jines | 280—511 X |
| 3,383,119 | 5/1968 | Carroll | 280—512 X |

FOREIGN PATENTS 929,892  6/1963  Great Britain.

LEO FRIAGLIA, Primary Examiner.

U.S. Cl. X.R.

280—511